United States Patent
Kapoor

Patent Number: 6,136,087
Date of Patent: Oct. 24, 2000

[54] CRYSTAL GROWTH INHIBITOR

[75] Inventor: Sain D. Kapoor, Tucson, Ariz.

[73] Assignee: Uhlich Color Company, Inc., Tucson, Ariz.

[21] Appl. No.: 09/185,931

[22] Filed: Nov. 4, 1998

[51] Int. Cl.$^7$ .............................. C09D 17/00; C09C 29/00
[52] U.S. Cl. .................. 106/496; 106/31.8; 106/493; 106/498; 106/499; 106/506
[58] Field of Search .................................. 106/493, 496, 106/498, 499, 506, 31.8

[56] References Cited

U.S. PATENT DOCUMENTS

| | | | |
|---|---|---|---|
| Re. 35,654 | 11/1997 | Platman et al. | 106/496 |
| 3,725,101 | 4/1973 | Kuhne et al. | 106/494 |
| 3,759,731 | 9/1973 | Kuhne et al. | 106/31.78 |
| 3,759,733 | 9/1973 | Bradley et al. | 106/496 |
| 3,775,148 | 11/1973 | Bradley | 106/496 |
| 3,776,749 | 12/1973 | McKay | 106/496 |
| 4,062,821 | 12/1977 | Haag et al. | 524/377 |
| 4,071,487 | 1/1978 | Linden et al. | 106/504 |
| 4,106,421 | 8/1978 | Haag et al. | 428/460 |
| 4,119,478 | 10/1978 | Robertson | 106/493 |
| 4,304,601 | 12/1981 | Sharp | 106/31.61 |
| 4,334,932 | 6/1982 | Roueche | 524/191 |
| 4,391,637 | 7/1983 | Mardis et al. | 106/474 |
| 4,461,647 | 7/1984 | Schofield et al. | 106/494 |
| 4,462,833 | 7/1984 | Hays et al. | 106/31.75 |
| 4,474,609 | 10/1984 | Ehl et al. | 106/494 |
| 4,561,899 | 12/1985 | Matrick | 428/204 |
| 4,648,907 | 3/1987 | Hays et al. | 106/496 |
| 4,664,709 | 5/1987 | Castenson | 106/496 |
| 4,680,057 | 7/1987 | Hays | 106/31.79 |
| 4,720,304 | 1/1988 | Ruff et al. | 106/494 |
| 4,793,863 | 12/1988 | Anantharaman et al. | 106/500 |
| 4,857,111 | 8/1989 | Haubennestel et al. | 106/504 |
| 4,863,517 | 9/1989 | Hang et al. | 106/1.13 |
| 4,880,567 | 11/1989 | Prabhu et al. | 252/512 |
| 4,883,714 | 11/1989 | Stockl et al. | 428/412 |
| 4,894,094 | 1/1990 | Ruff et al. | 106/496 |
| 4,927,466 | 5/1990 | Hays | 106/494 |
| 4,968,352 | 11/1990 | Keys et al. | 106/494 |
| 5,021,090 | 6/1991 | Schwartz et al. | 106/496 |
| 5,024,698 | 6/1991 | Schwartz et al. | 106/493 |
| 5,176,750 | 1/1993 | Kammer et al. | 106/496 |
| 5,246,494 | 9/1993 | Platman et al. | 106/496 |
| 5,264,032 | 11/1993 | Dietz et al. | 106/411 |
| 5,279,655 | 1/1994 | Takazawa et al. | 106/402 |
| 5,352,281 | 10/1994 | Weide et al. | 106/493 |
| 5,393,632 | 2/1995 | Ciccarelli et al. | 430/110 |
| 5,401,313 | 3/1995 | Supplee et al. | 106/429 |
| 5,482,548 | 1/1996 | Stirling et al. | 106/496 |
| 5,591,257 | 1/1997 | Weide et al. | 106/496 |
| 5,707,432 | 1/1998 | Adams et al. | 106/31.6 |
| 5,780,195 | 7/1998 | Nava | 430/110 |
| 5,800,609 | 9/1998 | Tuck et al. | 106/496 |
| 5,803,959 | 9/1998 | Johnson et al. | 106/31.75 |
| 5,830,528 | 11/1998 | Beall et al. | 427/220 |

FOREIGN PATENT DOCUMENTS 8-283596  10/1996  Japan.

OTHER PUBLICATIONS

T.G. Webber, *Coloring of Plastics*, John Wiley & Sons, New York, 1979, pp. 79–204. (no month).

R.H. Leach, editor, *The Printing Ink Manual*, Fourth Edition, Van Nostrand Reinhold (International) Co. Ltd., London (1988), pp. 282–591. (no month).

C.H. Hare, *Protective Coatings*, Technology Publishing Co., Pittsburgh (1994), pp. 63–288 (no month).

*Primary Examiner*—Anthony Green
*Attorney, Agent, or Firm*—David E. Rogers; Michael A. Lechter; Squire, Sanders & Dempsey

[57] ABSTRACT

A crystal growth inhibitor for azo pigments is disclosed. The crystal growth inhibitor comprises: (1) one or more sulfonated or carboxylated amines, and (2) one or more coupling components selected from the group consisting of acetoacetanilides, naphthanilides, pyrazalones and benzamidazoles; the coupling component being bonded to the sulfonated or carboxylated amines. The crystal growth inhibitor can be produced separately and added to the coupling component prior to the coupling reaction, or it can be formed in situ with the pigment. Preferably, an improved pigment according to the invention includes 2% to 5% by weight of the crystal growth inhibitor. Monoazo pigments including the crystal growth inhibitor have been shown to have greatly improved gloss, transparency and tinctorial strength.

33 Claims, No Drawings

CRYSTAL GROWTH INHIBITOR

FIELD OF THE INVENTION

The invention relates to a crystal growth inhibitor for azo pigments, and azo pigment compositions that include the crystal growth inhibitor. Azo pigments including the crystal growth inhibitor have improved gloss, transparency, and tinting strength in various application media, including oleo resinous, aqueous and non-aqueous (such as hydrocarbon solvents).

BACKGROUND OF THE INVENTION

Pigments are discrete colored particles which, when dispersed in the applicable media, impart color to it. The physical properties of pigments such as the particle size, size distribution, and the crystal structure are some of the parameters that determine the effectiveness and suitability of a particular pigment for a particular application, such as use in an aqueous media, non-aqueous media, or with plastics.

Azo pigments represent an important class of coloring agents used primarily in the manufacture of water-based inks, solvent-based inks, plastics, water-based paints and solvent-based paints. Some commonly utilized azo pigments are diarylide pigments including Pigment Yellow 12, Pigment Yellow 13, Pigment Yellow 14, Pigment Yellow 17 and Pigment Yellow 83. Other examples are disazo pyrazolone pigments, including Pigment Orange 13, Pigment Orange 34, Pigment Red 37, Pigment Red 38, Pigment Red 41 and Pigment Red 42.

Azo pigments are synthesized from various primary aromatic amines by a pigment synthesis process well known in the art, which includes the steps of diazotization and coupling. The diazotization preferably involves treating a primary aromatic amine with nitrous acid and the resulting compound is called diazonium salt. This diazonium salt is reacted with a coupling component to form the azo pigment in a reaction called a coupling reaction. Examples of coupling components are phenols, naphthols, and compounds that contain an enolyable methylene group, such as acetoacetanilides or pyrazalones.

Azo pigments, however, have deficiencies in certain applications and, in general, can be improved upon. For instance, in the graphic art industry, more specifically in multicolor printing, pigments of high color strength (i.e., high tinctorial strength) pure shade, good light fastness, and good flow properties (flow properties are also referred to as rheology) are needed. Moreover, especially in the case of yellow pigments, the ink industry has been able to obtain superior qualities in yellow pigments through the use of diarylide yellow pigments. Diarylide yellow pigments are undesirable, however, because of health hazards associated with dichlorobenzidine, which is used to manufacture the pigment and which is a carcinogen suspect. Therefore, monoazo pigments are used to avoid the health hazards associated with diarylide pigments despite the fact that monoazo dye properties are generally inferior.

One way to improve the properties of pigments is to alter their crystalline structure. It is generally understood by those skilled in the art that pigment particles aggregate or crystallize after the pigment is formed in a pigment synthesis process. It is also known that when a pigment is dispersed in the applicable media in which it is used, to some extent, the physical act of dispersion breaks apart these crystals or particle aggregations (hereinafter referred to simply as "crystals"). If allowed to, however, the pigment will separate from the media and recrystalize into large, aggregate particles. Pigment properties are improved if crystal growth can be inhibited, either prior to the initial formation of the crystals during pigment synthesis, or prior to recrystallization in an applicable media, because smaller crystals impart better pigment properties than larger crystals.

One example of a specific pigment problem due to large crystal size is disclosed in U.S. Pat. No. 4,474,609. There, the inventors explain that certain azo pigments show a certain solubility in some organic solvents or solvent-containing binding agents, which can adversely affect their applicability. For example, when certain pigments are dispersed in varnish binding agents the tinctorial strength increases at first as the dispersing period increases, but eventually levels off. Also, the tinctorial strength decreases upon storing ready-made varnish (i.e., which already includes the pigment dispersed in a media), and tinctorial strength tends to decrease more rapidly at higher temperatures because the pigment particles crystallize to form a large aggregate. The loss in tinctorial strength is in most cases accompanied by a decreasing transparency, and frequently also by an alteration of the shade.

The factor responsible for these undesirable processes in the preparation and storage of those varnishes is believed to be the recrystallization of the dispersed pigment particles in the solvents present. Owing to known physical laws, the small crystal particles having a high surface energy are dissolved, whereas the larger particles already present continue to grow, their ultimate size depending upon the solubility conditions. The resulting large crystal size leads to a loss in tinctorial strength and a reduced transparency.

U.S. Pat. No. 4,474,609 also discloses a recrystallization-resistant monoazo pigment of alleged high tinctorial strength. Col 2, ll. 5–8. The monoazo pigment mixtures are obtained by coupling diazotized amines of the benzedine series onto acetoacetic acid arylamides. Col. 2, ll. 9–11. A percentage of the diazo and/or coupling component contains acid groups, preferably sulfo and/or carboxy groups. Col. 2, ll. 14–16. Subsequently, the reactive acid groups of the product obtained by the coupling are reacted with cation-active quaternary compounds, especially quaternary ammonium or phosphonium compounds. Col. 2, ll. 16–18.

The present invention differs from the prior art in that the crystal growth inhibitor has a molecular structure of such geometry, with a polar group so situated, that it efficiently inhibits the growth of large pigment crystals (i.e., large aggregates of pigment particles). More specifically, the present invention discloses crystal growth inhibitors having a molecular structure similar to that of the azo pigments with which they are used, and containing at least one acid functional group (preferably sulfonic or carboxylic). The crystal growth inhibitors can be made in situ during synthesis of an azo pigment or added during synthesis of the pigment, preferably prior to the inception of pigment crystals.

The crystal growth inhibitor of the present invention does not utilize quaternary compounds, is a monoazo compound and covers a wide field of application, i.e., it can be used with all types of azo pigments and is not limited to diarylide yellow, arylamide yellow, β-naphthol red or arylamide red. It results in significant improvements, such as superior gloss, tinctorial strength and transparency in products such as water-based inks, solvent flexo inks, solvent gravure inks and oleoresenous inks.

SUMMARY OF THE INVENTION

Disclosed herein is a crystal growth inhibitor for use with azo pigments. Generally, the crystal growth inhibitor comprises two constituents: (1) a diazotisable aromatic amine including one or more acid groups and with or without functional groups, which is preferably one or more sulfonated and/or carboxylated amines, and (2) one or more coupling components bonded to the amines. If a sulfonated amine is used, it is preferably selected from one or more of the following: (1) aniline 3-sulfonic acid and its isomeric compounds containing other groups; (2) aniline 4-sulfonic acid and isomeric compounds containing other groups; and/or (3) aniline 2-sulfonic acid containing other groups. If a carboxylated amine is used, it is preferably selected from one or more of the following: (1) 2-amino benzoic acid and its isomeric compounds containing other groups; (2) 3-amino benzoic acid and its isomeric compounds containing other groups; and/or (3) 4-amino benzoic acid and its derivatives containing halogen, nitro, methoxy, ethoxy, or other functional groups. Any one, or any combination of, the above sulfonated or carboxylated amines may be used.

The coupling component may be one, or any combination of (1) an acetoacetanilide, (2) a naphthanilide, (3) a pyralzalone, or (4) a benzamidazalone.

The exact mechanism of how the crystal growth inhibitors disclosed herein improve pigment properties is not completely understood, and the invention is by no means limited to the mechanism by which it works. As previously discussed, however, it is known in the art that pigment particles aggregate together (or crystallize), and that relatively small crystals have superior properties than larger pigment crystals. By utilizing the crystal growth inhibitor of the present invention, the resulting pigment is believed to contain only sub-micron size crystals, which results in improved tictorial strength, gloss and transparency.

The crystal inhibitors of the invention may be formed separately and added to the synthesizing azo pigment (preferably prior to crystal formation), or are prepared in situ during the synthesis of the pigment, so that they are present prior to crystal formation.

DETAILED DESCRIPTION OF THE INVENTION

The crystal growth inhibitor disclosed herein can be used with monoazo and disazo pigments, the molecular structures and the process for making azo pigments being known to those skilled in the art. Pigments of this type are described, for instance, in W. Herbst, K. Hunger, *Industrielle Organsche Pigmente*, VCH-Verlag (1987), P. F. Gordon, P. Gregory, *Organic Chemistry In Color* (Springer-Verlog 1983); H. Zollinger, *Color Chemistry* (VCH Verlegseselschaft MBH 1987); P. Gregory, *High-Technology Applications of Organic Colorants* Plenum Press 1991); and J. Griffiths, *Colour and Constitution of Organic Molecules* (Academic Press 1976), the disclosures of which are incorporated herein by reference.

The crystal growth inhibitor of the present invention has two components. The first is a diazotisable aromatic amine with or without functional groups and including one or more acid groups. The second is called a coupling component.

More specifically, the diazotisable aromatic amine including an acid group is preferably one or more sulfonated and/or carboxylated amines, or similar compounds, which may have one or more functional groups such as halogen, methyl, ethyl, methoxy, ethoxy, carbomethyl, carbamido, carbanilido, nitro and others. These are reacted with one or more of the compounds called coupling components, which include acetoacetanilides and their derivatives, naphthanilides and their derivatives, pyralzalones and their derivatives, and benzamidazolones and their derivatives, to form a crystal growth inhibitor according to the invention.

Some sulfonated amines that may be used to practice the invention are: (1) aniline 4-sulfonic acid, which may include one or more groups such as halogen methyl, ethyl, methoxy, ethoxy, carbomethyl, carbamido, carbanilido and nitro; (2) aniline-2-sulfonic acid which may include one or more groups such as halogen methyl, ethyl, methoxy, ethoxy, carbomethyl, carbamido, carbanilido and nitro; (3) aniline-3 sulfonic acid which may include one or more groups such as halogen methyl, ethyl, methoxy, ethoxy, carbomethyl, carbamido, carbanilido and nitro. Some carboxylated amines that may be used to practice the invention are: (1) 2-amino benzoic acid which may include one or more groups such as halogen, methyl, ethyl, methoxy, ethoxy, carbomethyl, carbamido, carboanilide and nitro; (2) 3-amino benzoic acid which may include one or more groups such as halogen methyl, ethyl, methoxy, ethoxy, carbomethyl, carbamido, carbanilido and nitro; and (3) 4-amino benzoic acid which may include one or more groups such as halogen methyl, ethyl, methoxy, ethoxy, carbomethyl, carbamido, carbanilido and nitro.

Some coupling compounds that may be used to practice the invention are: (1) acetoacetanilides, including (a) acetoacetanilide; (b) acetoacet-o-anisidide; (c) acetoacet-p-anisidide; (d) acetoacet-o-toluidide, and (e) acetoacet-2,5-dimetheoxy-4-choloranilide; (2) naphthanilides, including: (a) naphthol AS, naphthol AS-D, naphthol AS-BS, naphthol AS-OL, naphthol AS-KB, naphthol AS-LC, naphthol AS-CA, naphthol AS-PH and others known in the industry; (3) pyrazalones, including: (a) 3-methyl 1-phenyl pyralzalone; and (b) pyralzalone compounds, including those containing halogen, nitro, methyl, methoxy, or other groups in the benzene ring; and (4) benzamidazolones such as 3-hydroxyl-n-(2-oxo-5-benzimidazoline)-2-naphthamide.

The formulas of the aforementioned naphthanilides are known to those skilled in the art and are as follows:

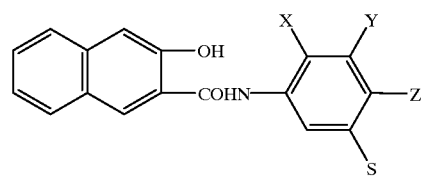

If X=Y=Z=S=H (or hydrogen), the compound is naphthol AS.

If X=CH$_3$, Y=H, Z=H and S=H, the compound is naphthol AS-D.

If X=H, Y=NO$_2$, Z=1 and S=H, the compound is naphthol AS-BS.

If X=OCH$_3$, Y=H, Z=H and S=H, the compound is naphthol AS-OL.

If X=CH$_3$, Y=H, Z=H and S=Cl (or chlorine), the compound is naphthol AS-KB.

If X=OCH$_3$, Y=H, Z=Cl and S=OCH$_3$, the compound is naphthol AS-LC.

If X=OCH$_3$, Y=H, Z=H and S=Cl, the compound is naphthol AS-CA.

If X=OC$_2$H$_5$, Y=H, Z=H and S=H, the compound is naphthol AS-PH.

Further, one, or combination of, any of the above coupling components can be added to any one, or combination of, the above amines to form a crystal growth inhibitor according to the invention. The crystal growth inhibitor may be included in an azo pigment according to the invention from 0.1% to 25% by weight, but the preferred range is 2–5% by weight.

A major application of pigments made according to the invention is in the manufacture of printing inks. As explained below, printing inks including the improved pigments of the invention have much improved gloss, transparency and tinctorial strengths. The improved pigments of the present invention may also be used in paints and plastics. With regards to ink, paint and plastic, their respective formulations are disclosed in: R. H. Leach, editor, *The Printing Ink Manual*, Fourth Edition, Van Nostrand Reinhold (International) Co. Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used.

The crystal growth inhibitor can be made in situ. Or it can be made separately and added during synthesis of the azo pigment either at the start of the pigment synthesis process, but preferably prior to crystallization of the pigment. All the constituents listed below are expressed by parts by weight.

The following examples illustrate the composition of the present invention and its methods of preparation. Unless otherwise indicated in the following examples or elsewhere in the specification or claims, all parts and percentages are by weight, temperatures are in degrees centigrade and pressures are at or near atmospheric.

EXAMPLE 1

Preparation of Azo Pigment (a) 16.8 parts of m-nitro o-anisidine (MNOA) are dissolved in 250 parts of water containing 32.5 g 28% hydrochloric acid. The solution is cooled to 0 degrees C. with ice. While stirring, 7.0 gm sodium nitrite as 10% solution in water is added. Stirring at 0 degrees C. is continued until the diazotisation is complete. The excess nitrous acid is neutralized with sulfamic acid.

(b) To 600 cc water containing 10.0 parts of caustic soda, 21.3 parts acetoacet-o-anisidide (AAOA) is added while stirring. When the solution is complete, 14 parts glacial acetic acid is added to reprecipitate AAOA.

(c) Solution (a) is added to solution (b) over a 60–70 minute period with adequate stirring. At the end, there is preferably no reaction for diazo. The slurry is heated to boil and boiled for one hour. Then it is filtered and washed, preferably until no soluble salts are detected. This is dried with a yield of approximately 37.0 parts.

EXAMPLE 2

Preparation of Crystal Growth Inhibitor in Situ

Example 1 is repeated except 2.5% of MNOA is replaced by o-nitro-aniline 4-sulfonic acid in step (a). This procedure makes approximately 2.5% by weight of crystal growth inhibitor and 97.5% by weight of pigment in situ.

EXAMPLE 3

Separate Preparation of Crystal Growth Inhibitor

In a separate vessel, 0.6 parts of o-nitro-aniline 4-sulfonic acid is diazotised in the regular way and reacted (or coupled) with 0.53 grams of acetoacet-o-anisidide. These reactions are known by those skilled in the art. The resulting dye is added to step (b) in example 1 and the coupling reaction of step (c) is completed.

Comparison

The pigments prepared in Examples 1, 2 and 3 were each evaluated in the following water vehicle:
Preparation of the Water Vehicle
  In a vessel, prepare:
  Joncryl 61 (from S. C. Johnson)=227.0 parts
  Colloid 999=17.0 parts
  Diethylene Glycol=83.0 parts
  Water=1373.0 parts
The above is mixed thoroughly. Afterwards, the pigments of Examples 1, 2 and 3 above were prepared for testing in the manner described below:
Preparation of the Inks From the Pigments of Example 1, 2 and 3
  In an 8 oz. jar, prepare:
  Pigment=15.0 grams
  Water Vehicle=85.0 grams
  Glass Beads=200 grams
These are mixed for 90 minutes on a Red Devil Shaker.

Results

Drawdowns of the above inks were made on Lenta form 3NT-3 using #5 Meyer Rod in accordance with the test method known by those in the art. The results are shown in the following chart:

| Ink Made From The Pigment of Example: | Transparency | Gloss | Tinctorial Strength |
| --- | --- | --- | --- |
| 1 | — | — | 100% |
| 2 | +4 | +4 | 110% |
| 3 | +5 | +5 | 115% |

Where 1 is equal; 2 is slightly; 3 is moderately; 4 is very good; and 5 is excellent; these values being understood by those skilled in the art. As can be seen, using the standard azo pigment of Example 1 as a basis, printing inks made with azo pigments including the crystal growth inhibitor of the present invention (i.e., Examples 2 and 3) have much improved transparency, gloss and tinctorial strength as compared to the same pigment without the crystal growth inhibitor (i.e., Example 1).

Having now described a preferred embodiment of the invention, deviations and modifications that do not depart from the spirit of the invention will occur to others. Thus, the invention is not limited to the foregoing description but is instead set forth in the following claims and legal equivalents thereof.

What is claimed is:

1. An improved monoazo pigment for use in a water-based media, the pigment including:
    (a) a monoazo pigment for use in a water-based media; and
    (b) a crystal growth inhibitor comprising:
        (i) one or more sulfonated amines or one or more carboxylated amines, or a combination thereof; and
        (ii) a coupling component selected from one or more of the group consisting of acetoacetanilides, naphthanilides, pyrazalones and benzamidazolones.

2. The improved pigment of claim 1 which includes 0.1% to 25% crystal growth inhibitor by weight.

3. The improved pigment of claim 1 which includes 2% to 5% crystal growth inhibitor by weight.

4. The pigment of claim 1 wherein the amine is one or more sulfonated amines.

5. The pigment of claim 1 wherein the amine is one or more carboxylated amines.

6. The pigment of claim 1 wherein the coupling component includes acetoacetanilide.

7. The pigment of claim 6 wherein the coupling component includes acetoacet-o-anisidide.

8. The pigment of claim 6 wherein the coupling component includes acetoacet-p-anisidide.

9. The pigment of claim 6 wherein the coupling component includes acetoacet-o-toluidide.

10. The pigment of claim 6 wherein the coupling component includes acetoacet-2,5-dimethoxy-4-choloranilide.

11. The pigment of claim 1 wherein the coupling component includes a naphthanilide.

12. The pigment of claim 11 wherein the coupling component includes naphthol AS.

13. The pigment of claim 11 wherein the coupling component includes naphthol AS-D.

14. The pigment of claim 11 wherein the coupling component includes naphthol AS-BS.

15. The pigment of claim 11 wherein the coupling component includes naphthol AS-OL.

16. The pigment of claim 11 wherein the coupling component includes naphthol AS-KB.

17. The pigment of claim 11 wherein the coupling component includes naphthol AS-LC.

18. The pigment of claim 11 wherein the coupling component includes naphthol AS-CA.

19. The pigment of claim 11 wherein the coupling component includes naphthol AS-PH.

20. The pigment of claim 1 wherein the coupling component includes a pyrazalone.

21. The pigment of claim 20 wherein the coupling component includes 3-methyl 1-phenyl pyrazalone.

22. The pigment of claim 20 wherein the coupling component includes a pyrazalone having a benzene ring, the pyrazalone containing either a halogen, nitro, methyl or methoxy group in the benzene ring.

23. The pigment of claim 1 wherein the coupling component includes a benzamidazalone.

24. The pigment of claim 23 wherein the coupling component includes 3 hydroxyl-n-(2-oxo-5-benzimidazoline)-2-naphthamide.

25. The pigment of claim 1 wherein the coupling component comprises one or more of the group consisting of: (i) acetoacetanilides containing one or more of the following: halogen, methyl, ethyl, methoxy, ethoxy, carbomethyl, carbamido, carbanilido or nitro; (ii) naphthanilides containing one or more of the following: halogen, methyl, ethyl, methoxy, ethoxy, carbomethyl, carbamido, carbanilido or nitro; (iii) pyrazalones containing one or more of the following: methyl, ethyl, methoxy or ethoxy; and (iv) benzamidazalones.

26. The pigment of claim 1 wherein the amines include aniline 4-sulfonic acid containing one or more constituents selected from the group consisting of halogen, methyl, ethyl, methoxy, ethoxy, carbomethyl, carbamido, carbanilido and nitro.

27. The pigment of claim 1 wherein the amines include aniline-3-sulfonic acid containing one or more constituents selected from the group consisting of methyl, ethyl, methoxy, ethoxy, carbomethyl, carbamido, carbanilido and nitro.

28. The pigment of claim 1 wherein the amines include aniline-2-sulfonic acid containing one or more constituents selected from the group consisting of methyl, ethyl, methoxy, ethoxy, carbomethyl, carbamido, carbanilido and nitro.

29. The pigment of claim 1 wherein the amines include 2-amino benzoic acid containing one or more constituents selected from the group consisting of methyl, ethyl, methoxy, ethoxy, carbomethyl, carbamido, carbanilido and nitro.

30. The pigment of claim 1 wherein the amines include 3-amino benzoic acid containing one or more constituents selected from the group consisting of methyl, ethyl, methoxy, ethoxy, carbomethyl, carbamido, carbanilido and nitro.

31. The pigment of claim 1 wherein the amines include 4-amino benzoic acid containing one or more constituents selected from the group consisting of methyl, ethyl, methoxy, ethoxy, carbomethyl, carbamido, carbanilido and nitro.

32. A printing ink composition comprising a water-based ink vehicle and the improved pigment of claim 1.

33. A paint composition comprising a water-based paint vehicle and the improved pigment of claim 1.

* * * * *